United States Patent [19]

Snider

[11] 4,303,252
[45] Dec. 1, 1981

[54] CHUCK FOR ROTARY TOOL

[75] Inventor: Philip A. Snider, Hicksville, Ohio

[73] Assignee: Cooper Industries, Inc., Houston, Tex.

[21] Appl. No.: 132,580

[22] Filed: Mar. 21, 1980

[51] Int. Cl.³ .................... B23B 31/14; B23B 31/18
[52] U.S. Cl. .................................. 279/35; 279/1 C; 279/106
[58] Field of Search ............... 279/1 C, 1 F, 35, 36, 279/107, 106

[56] References Cited

U.S. PATENT DOCUMENTS

| | | | |
|---|---|---|---|
| 421,718 | 2/1890 | Ives | 279/108 |
| 609,478 | 8/1898 | Sturgis | 279/35 |
| 1,649,567 | 11/1927 | Bruckmann | 279/108 |
| 2,356,245 | 8/1944 | Johnson | 279/35 |
| 3,495,844 | 2/1970 | Dee | 279/35 |
| 3,762,732 | 10/1973 | Speed | 279/102 |
| 3,794,335 | 2/1974 | Thackston et al. | 279/23 |

FOREIGN PATENT DOCUMENTS 47588 5/1909 Switzerland ................ 279/1 F

*Primary Examiner*—Robert D. Baldwin
*Attorney, Agent, or Firm*—Michael E. Martin

[57] ABSTRACT

A chuck for a rotary tool includes a body having a cylindrical bore for receiving the shank of a work performing member. A sleeve surrounds the body and forms an annular space in which is disposed a pair of opposed jaws which extend through opposed slots in the body for forcibly engaging the shank. The jaws each include an integral lever and an outer edge forming a fulcrum about which the levers are pivoted to force the jaws into engagement with the shank. A nut with a conical cam surface is threadedly disposed on the body and engages the levers in response to manual turning of the nut to clamp or release the shank.

10 Claims, 4 Drawing Figures

U.S. Patent  Dec. 1, 1981  4,303,252
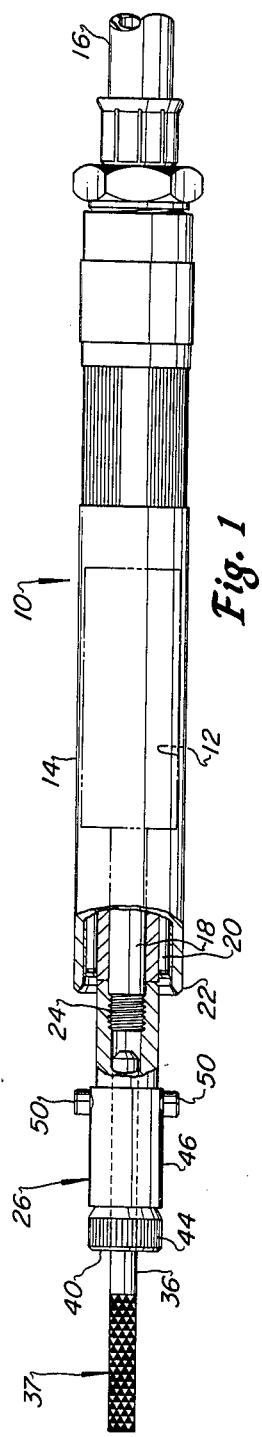
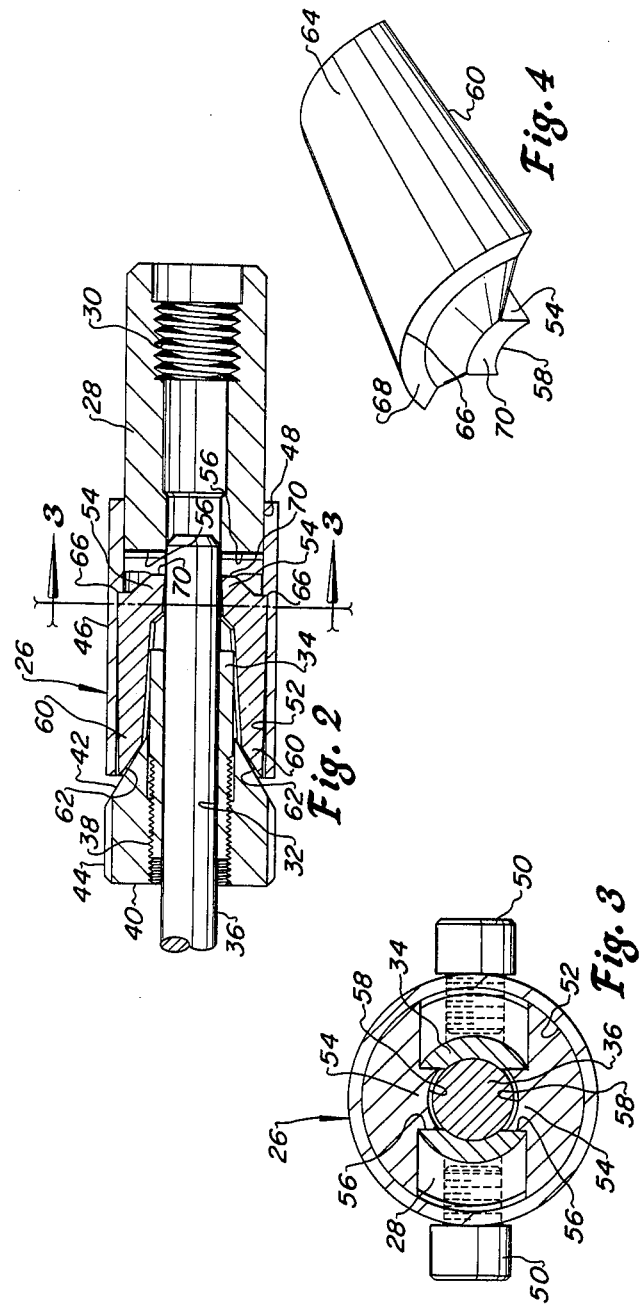

CHUCK FOR ROTARY TOOL

BACKGROUND OF THE INVENTION

The present invention pertains to a chuck for releasably holding a bit or other work performing member attached to the rotary output spindle of a rotary power tool or the like. The term work performing member can include such devices as drill bits and various finishing tools such as grinding and deburring tools, rotary files, milling and boring tools and other rotary devices which include a stem or shank which is releasably connected to a power head which has a rotary output spindle.

A variety of chucks or work performing member holding devices are known for use with rotary power tools as well as machine tools and manually operated tools. In particular, relatively high speed rotary tools for drilling, and so-called finishing work such as grinding, filing and deburring operations require a chuck which is operable to securely hold the work performing member, provide for quick release so that one member may be exchanged for another, and provide accurate alignment of the member with the axis of rotation of the tool output spindle. U.S. Pat. Nos. 3,495,844; 3,762,732 and 3,794,335 disclose examples of prior art types of chucks for relatively high speed rotary tools. U.S. Pat. Nos. 421,718 and 1,649,567 also disclose chucks which have work performing member clamping mechanisms which are similar in some respects to the chuck of the present invention.

The problems associated with prior art chucks which are solved by the present invention are basically related to the fact that none of the known chucks combine all of the desired features of a chuck intended primarily for use with relatively high speed hand held rotary power tools. For example, it is important to provide a chuck which is capable of producing a high clamping force on the work performing member without the use of wrenches or keys, that is, the chuck should be capable of rapid manual operation to clamp or release the work performing member without the use of any tools. It is also important that the work performing member be retained in accurate alignment with the axis of rotation of the rotary drive or output spindle of the tool. Furthermore, it is desirable that there not be any centrifugal forces generated by high speed rotation of the chuck which would tend to lessen the retaining force on the work performing member. These features as well as others are obtained with the present invention as will be appreciated by those skilled in the art upon reading the detailed description in conjunction with the drawing.

SUMMARY OF THE INVENTION

The present invention provides a chuck for rotary power tools and the like which is particularly adapted for use on relatively high speed hand held tools for drilling and so-called finishing work.

The chuck of the present invention provides for applying a substantial retaining force to the shank of a work performing member as well as quick release without the use of tools such as wrenches or keys. The work performing member retaining mechanism of the chuck of the present invention includes a pair of lever actuated jaws for engaging the shank of the work performing member which provide for opposed clamping forces which do not tend to displace the work performing member out of alignment with respect to the axis of rotation of the tool output spindle. The lever actuated jaws are actuated to engage and release the work performing member by a nut having a fine pitch thread which engages the jaw levers to provide a high clamping force with a relatively low manual twisting force on the nut to clamp or release the work performing member.

The lever actuated jaws also provide for increasing the gripping force on the work performing member in response to centrifugal forces generated by the rotation of the chuck. Accordingly, the clamping forces exerted by the chuck are actually increased during high speed operation of the tool.

A further advantage of the present invention is that there is little or no tendency for the work performing member to remain stuck in the chuck when the jaws are released from forcible engagement with the member.

A still further advantage of the present invention resides in the fact that the work performing member is retained in the chuck within an axial bore of a supporting body whereby coaxial alignment of the work performing member with the tool drive spindle is easily maintained.

It will be appreciated that the present invention possess substantially all of the advantages desired in a chuck for high speed rotary tools and yet comprises a structurally simple and compact device that is relatively economical to manufacture.

BRIEF DESCRIPTION OF THE DRAWING

FIG. 1 is a longitudinal side elevation of a rotary power tool which includes the chuck of the present invention;

FIG. 2 is a longitudinal center section view of the chuck on a larger scale;

FIG. 3 is a section view taken along the line 3—3 of FIG. 2; and

FIG. 4 is a perspective view of one of the chuck jaws.

DESCRIPTION OF THE PREFERRED EMBODIMENT

Referring to FIG. 1 of the drawing there is shown a hand-held rotary power tool generally designated by the numeral 10. The power tool 10 may be one of a variety of conventional tools which basically are characterized by a pressure fluid driven turbine or rotary vane motor 12 disposed in a housing 14. Pressure fluid such as compressed air is supplied to the tool by a flexible hose 16. The tool 10 is also characterized by a rotary output spindle 18 directly connected to the motor. The spindle 18 is rotatably mounted in a suitable bearing 20 disposed in a nose portion 22 of the housing 14.

The spindle 18 includes an externally threaded distal end portion 24 to which is connected a chuck generally designated by the numeral 26. Referring also to FIG. 2 the chuck 26 comprises an elongated cylindrical body 28 which has cooperating internal threads 30 formed axially in one end to provide for attaching the chuck to the spindle 18 as shown. The chuck body 28 also includes an axial bore 32 which extends through a reduced diameter portion 34 and is substantially coaxial with the threaded portion 30 and the axis of rotation of the spindle 18. The bore 32 is adapted to receive the shank 36 of a rotary work performing member 37 which is shown as a rotary grinding tool but which also may be another form of rotary work performing member such as a drill bit, or a rotary file, and the like. The bore 32 is dimensioned to receive the shank in close fitting relationship to maintain accuracy of alignment with respect to the axis of rotation of the spindle 18. In order to further improve the alignment of the chuck with respect to a rotational axis the body 28 may be adapted to connect directly to the rotor of the tool motor and be supported in a suitable bearing as taught in U.S. Pat. No. 3,728,052.

The chuck body 28 further includes an externally threaded portion 38 on the end opposite the threaded portion 30 and which is adapted to receive a nut 40. The nut 40 has a conical cam surface portion 42 and is formed with serrations on a cylindrical exterior part 44 to provide for manual turning of the nut without a wrench or other tool.

The chuck 26 is also characterized by a tubular sleeve 46 which is removably fitted on a larger diameter portion 48 of the chuck body 28 in close fitting relationship thereto. The sleeve 46 is suitably secured to the chuck body 28 by two socket head screws 50 which are threaded into the chuck body. The sleeve 46 is provided with a bore 52 which forms an annular space around the reduced diameter portion 34 of the body 28.

Referring to FIGS. 2 and 3 the chuck 26 includes a pair of diametrically opposed jaws 54 which are disposed in the annular space formed between the body 28 and the sleeve 46. The jaws 54 extend through elongated radially extending transverse slots 56 in the chuck body 28 for engagement with the shank 36 of the work performing member 37. The jaws 54 are provided with concave surfaces 58 the curvatures of which conform substantially to the diameter of the bore 32 and the shank 36. Accordingly, the jaws 54 may be forcibly engaged with the shank 36 to frictionally grip the same without causing any marring or damage to the surface of the shank. The jaws 54 are also characterized by integral levers 60 which extend axially within the annular space between the sleeve 46 and body 28 and are each formed with a conical surface 62 engageable with the surface 42 of the nut 40. The outer exterior surfaces 64 of the levers 60 are curved to conform substantially to the cylindrical surface formed by the bore 52 in the sleeve. As shown in FIGS. 2 and 4 a curved edge 66 is formed by the outer curved surface 64 of each jaw 54 and a transverse end face 68. The edge 66 is engageable with the cylindrical surface of the bore 52 and serves as a fulcrum point about which each jaw pivots as the nut 40 is turned to engage the conical surfaces 62. The surface 64 of each lever 60 is actually sloped somewhat radially inwardly in the axial direction from the edge 66 toward the surface 62 to provide clearance for pivotal movement of the lever about the edge 66.

The combination of elements in the chuck 26 provide a relatively high mechanical advantage whereby a light to moderate manual turning effort on the nut 40 produces a substantial clamping force of the jaws 54 on the shank 36 but also without any tendency for the jaws to stick in the clamped position when the nut is turned to move out of engagement with the jaws. The relatively fine pitch of the threads of the nut 40 together with the wedge action of the nut against the conical surfaces 62 may produce a mechanical advantage in the range of 150:1. Moreover the jaws 54 may be proportioned such that the fulcrum formed by the edge 66 produces a mechanical advantage of approximately 10:1 when measuring the axial distance from the axial center of the surface 62 to the edge 66 as compared to the axial distance from the edge 66 to the transverse end face 70 of the jaws. The mechanical advantage provided by the fulcrum formed by the edge 66 may, of course, be adjusted by placement of the edge itself when designing the jaws. However, an overall mechanical advantage of approximately 1500:1 has been determined to be desirable for a chuck designed to hold work performing tools or members with a shank diameter of approximately 3.2 mm. It has also been determined that a nut 40 with a nominal thread diameter of about 4.75 mm and 2.5 threads per millimeter, and an angle of approximately 30 degrees for the surface 42 with respect to the axis of the nut will provide the above-mentioned mechanical advantage with virtually no tendency for the nut to jam.

As will be appreciated from the foregoing description the chuck 26 provides for easy and rapid manual operation to insert and clamp a work performing member and for equally easy and rapid removal of a work performing member by a more turning of the nut 40 in one direction or the other, respectively. Moreover, the chuck 26 is provided with a shank holding body 28 which has a cylindrical bore for supporting the work performing member and which can be dimensioned to provide accurate axial alignment of the work performing member. The accuracy of alignment of the work performing member is also enhanced by the arrangement of the opposed clamping jaws 54 which exert opposed and substantially equal clamping forces on the shank.

When it is desired to insert the shank of a work performing member into the chuck 26 the nut 40 is turned to allow the jaws to pivot about the respective edges 66 so that the jaw surfaces 58 will permit insertion of the shank into the bore 32. The nut 40 is then merely hand tightened by turning in the opposite direction to pivot the jaws 54 into forcible engagement with the shank. By locating the fulcrum formed by the edge 66 close to the end face 70 of each jaw the center of gravity of each jaw is located between the edge 66 and the end of the jaw which engages the nut. Accordingly, the jaws tend to pivot in the direction which increases the clamping force on the shank of the work performing member as the speed of rotation of the chuck increases due to centrifugal force acting on the jaws through their respective centers of gravity.

It may also be appreciated from the foregoing that the chuck 26 may be easily assembled and disassembled to replace any one or more of the chuck parts. The sleeve 46 could be fastened to the body 28 by other means such as cooperating threads on the body and the sleeve. Furthermore, by providing the jaws with the radially inwardly extending portions which form the concave surfaces 58 and which extend into the slots 56 the jaws are retained in the annular space between the sleeve 46 and the body 28 even if the nut 40 is removed from the body. The unique design of the jaws 54 and the means for retaining and actuating the jaws also eliminates the need for the jaws to be mounted on fixed pivot members as with certain prior art chucks.

What I claim is:
1. A chuck for a rotary tool or the like comprising:
   a body including a portion at one end adapted to be rotatably connected to a drive spindle or the like;
   an axial bore in said body opening toward the other end of said body for receiving and supporting a shank of a rotary work performing member;
   a sleeve surrounding and fixedly secured to said body and forming an annular space between said body and an inner wall surface of said sleeve;

at least two jaws disposed on said chuck and being engageable with said shank, each of said jaws including respective generally axially extending levers for pivotally moving said jaws generally radially inwardly with respect to the axis of said bore into shank engaging position; and means on said chuck engageable with said levers for pivotally moving said levers radially outwardly with respect to the axis of said bore to cause said jaws to forcibly engage said shank for retaining said shank in said bore.

2. The chuck set forth in claim 1 wherein:

said means engageable with said levers comprises a nut threadedly disposed on said body and including a cam surface engageable with cooperating surfaces on one end of each of said levers in response to turning of said nut to cause said levers to move said jaws into forcible engagement with said shank.

3. The chuck set forth in claim 2 wherein:

said levers on said jaws are disposed in said annular space, said jaws each include a portion forming a fulcrum edge engageable with a cooperating surface on said sleeve for pivoting said levers in response to engagement of said surfaces on said levers with said nut for forcing said jaws into engagement with said shank.

4. The chuck set forth in claim 3 wherein:

said jaws are retained in said annular space by said sleeve and said body.

5. The chuck set forth in claim 3 wherein:

said chuck includes two jaws diametrically opposed to each other and movable radially inwardly in response to pivotal movement of said levers.

6. The chuck set forth in claim 3 wherein:

the center of gravity of each of said levers is disposed between said fulcrum and said cooperating surface and in response to rotation of said chuck centrifugal force acting on each of said levers at said centers of gravity increases the clamping force of said jaws on said shank.

7. The chuck set forth in claim 3 wherein:

said levers of said jaws extend axially within said sleeve from said fulcrum edges and said jaws include shank engaging surfaces disposed radially inwardly of said fulcrum edges with respect to the axis of said bore.

8. The chuck set forth in claim 7 wherein:

said cooperating surfaces on said levers are disposed on said ends of said levers opposite said fulcrum edges and said levers are pivoted radially outwardly upon engagement by said nut to cause said shank engaging surfaces to be forced generally radially inwardly into gripping engagement with said shank.

9. The chuck set forth in claim 1 wherein:

said sleeve is separable from said body and said chuck includes means for retaining said sleeve on said body.

10. A chuck for a rotary tool comprising:

a body adapted to be rotatably driven by a drive spindle or the like;

an axial bore in said body opening to one end of said body for receiving and supporting a shank of a rotary work performing member;

a sleeve surrounding said body and forming an annular space between said body and an inner wall surface of said sleeve;

at least two jaws disposed on said chuck and being engageable with said shank, each of said jaws including respective levers disposed in said annular space, each of said jaws including a portion forming a fulcrum about which said levers are pivoted for forcing said jaws into engagement with said shank;

a nut threadedly disposed on said body and including a cam surface engageable with cooperating surfaces on each of said levers in response to turning of said nut to cause said levers to move said jaws into forcible engagement with said shank for retaining said shank in said bore; and the center of gravity of each of said levers is disposed between said fulcrum and said cooperating surface and in response to rotation of said chuck centrifugal force acting on each of said levers at said centers of gravity increases the clamping force of said jaws on said shank.

* * * * *